US006866167B2

(12) United States Patent
Bougamont

(10) Patent No.: US 6,866,167 B2
(45) Date of Patent: Mar. 15, 2005

(54) DEVICE FOR METERING LIQUID OR GEL PRODUCTS

(75) Inventor: Jean-Louis Bougamont, Eu (FR)

(73) Assignee: Rexam Dispensing Systems (FR)

( * ) Notice: Subject to any disclaimer, the term of this patent is extended or adjusted under 35 U.S.C. 154(b) by 0 days.

(21) Appl. No.: 10/689,020

(22) Filed: Oct. 20, 2003

(65) Prior Publication Data

US 2004/0134935 A1 Jul. 15, 2004

Related U.S. Application Data

(63) Continuation of application No. PCT/FR02/01345, filed on Apr. 19, 2002.

(30) Foreign Application Priority Data

Apr. 20, 2001 (FR) ........................................... 01 05367

(51) Int. Cl.[7] ................................................ G01F 11/06

(52) U.S. Cl. ............................... 222/321.7; 222/321.9; 222/153.02; 222/153.13

(58) Field of Search ....................... 222/153.01, 153.02, 222/153.09, 153.1, 153.13, 153.14, 320, 321.1, 321.6, 321.7, 321.8, 321.9, 380, 385, 482

(56) References Cited

U.S. PATENT DOCUMENTS

| | | | | |
|---|---|---|---|---|
| 4,524,888 A | * | 6/1985 | Tada | 222/153.02 |
| 6,206,245 B1 | * | 3/2001 | Bonningue | 222/321.7 |
| 6,209,761 B1 | * | 4/2001 | Bonningue | 222/321.7 |
| 6,357,629 B1 | * | 3/2002 | Ding | 222/153.13 |

* cited by examiner

*Primary Examiner*—Michael Mar
*Assistant Examiner*—Patrick Buechner
(74) *Attorney, Agent, or Firm*—St. Onge Steward Johnston & Reens LLC

(57) ABSTRACT

The invention concerns a device for dispensing a dose of liquid or gel products comprising a dispensing head axially mobile mounted on a product reservoir and provided with an outlet conduit and a metering chamber delimited by an intake valve and by a piston whereof the rod is connected to said head and which is equipped with an exhaust valve. The invention is characterized in that the rod of the piston extends inside the chamber through a projecting lower end providing sealed locking of the intake valve when the head is in low position.

15 Claims, 3 Drawing Sheets

DEVICE FOR METERING LIQUID OR GEL PRODUCTS

This application is a continuation of International Patent Application No. PCT/FR02/01345, filed Apr. 19, 2002 and designating the United States, which application claims priority from French Patent Application No. 01/05367, filed Apr. 20, 2001.

The present invention relates to a device for metering a liquid or gel product.

More precisely, the device of the invention is of the type comprising an axially mobile dispenser head on top of a product reservoir, which head is provided with an outlet duct, and a metering chamber defined on the one hand by an inlet valve and on the other hand by a piston, whose rod is connected to said head and which is equipped with an outlet valve.

However, devices of this type are complex, in particular because the outlet valve has to ensure that the chamber remains sealed at the upper part, this latter always being full of product when the device is in the rest position.

Moreover, these devices generally comprise a return member for returning the head to the upper position, consisting of a metal helical spring.

Apart from the recycling problems created thereby, this spring is a component which is difficult to position functionally without impairing the effectiveness of the device or making it bulkier.

EP 0 974 401 discloses a device of this type provided with a return spring for returning the head to the upper position, in which device the piston rod is extended inside the chamber by a lower projecting end ensuring sealed locking of the inlet valve when the head is in the lower position and in which device the chamber is formed in a cylindroconical socket provided with an upper flange for attachment to the rim of the reservoir.

In this known device, the head is held in the upper position with regard to separation relative to the reservoir by a flange.

The head is held in the lower position by a bayonet system which is brought into operation by pressing on the head and rotating the latter. However, in said lower position, slight vertical deflection of the head is possible and there is a risk that the valve may not always be locked in sealed manner. Moreover, when it is in the upper position, the head may easily be moved downwards, causing untimely actuation of the device.

According to the present invention, there is provided a device for metering liquid or gel products comprising an axially mobile dispenser head on top of a product reservoir, the head having an outlet duct. The device further comprises a metering chamber defined on the one hand by an inlet valve and on the other hand by a piston, having a rod connected to the head and having an outlet valve. The piston-rod is extended inside the chamber by a lower projecting end ensuring sealed locking of the inlet valve when the head is in a lower position. The chamber is formed in a cylindroconical socket having an upper flange for attachment to a rim of the reservoir. The dispenser head comprises an outer lateral skirt provided with a first catch capable of cooperating by latching with a second, lower catch formed on the flange for catching the head in the lower position and capable of cooperating with a second, upper catch for holding the head in the upper position, and preventing separation. The device is free of a dispenser head displacement return means.

As a result of these arrangements, even if, with the head in the upper position, pressure were exerted involuntarily on the latter resulting in downward displacement thereof, it would automatically be caught in the lower position by simple latching, thereby preventing refilling of the metering chamber.

Advantageously, the first catch is formed at the lower part of the outer lateral skirt.

Advantageously, the first catch takes the form of a rib, while the second, lower catch takes the form of a lower recessed portion.

The second, upper catch is for its part advantageously formed of an upper retaining ring capable of retaining the rib.

This rib and this retaining ring may be so dimensioned as to generate, when the skirt of the head slides against the flange, frictional forces requiring the application of a given minimum effort to displace the head.

In a variant, the second, upper catch may cooperate by latching with the first catch when the head is in the upper position.

For example, this second, upper catch may take the form of an upper recessed portion, similar to the lower recessed portion.

Preferably, the flange is provided with a venting orifice optionally extended by a groove formed in the outer wall of the socket.

In this case, the venting orifice is advantageously disposed through a shoulder providing a connection with the body of the socket. Furthermore, said head advantageously comprises a cylindrical internal wall, coaxial with said skirt and designed to seal the venting orifice when the head is in the lower position.

According to another feature, the piston rod comprises an axial ejection duct opening, at the upper part, in a cavity in said head in which the outlet valve is accommodated According to one variant, said cavity is formed in a sleeve integral with the lower part of the head and connected coaxially with the upper end of the piston rod.

Preferably, the upper wall of said cavity is provided with channels communicating with the outlet duct for the product.

According to another feature, the inlet valve comprises an axial tube projecting inside the chamber and in which the lower end of the piston rod engages when the head is in the lower position.

According to a further variant, the side wall of the tube comprises at least one port for passage of the product.

According to another variant, the inlet valve and/or the outlet valve comprise a mobile sealing ball.

Due to its simple structure consisting of only a few components, the device according to the invention does not require return means of the spring type. It is also easy to manufacture and thus reliable and economical.

This device may be used both in the field of pharmacy, where it may allow metering and dispensing in particular of syrups, and in the field of cosmetic or food products.

The invention will be better understood from a reading of the following description made with reference to the drawings, which are by way of example only and in which.

Figure 1:
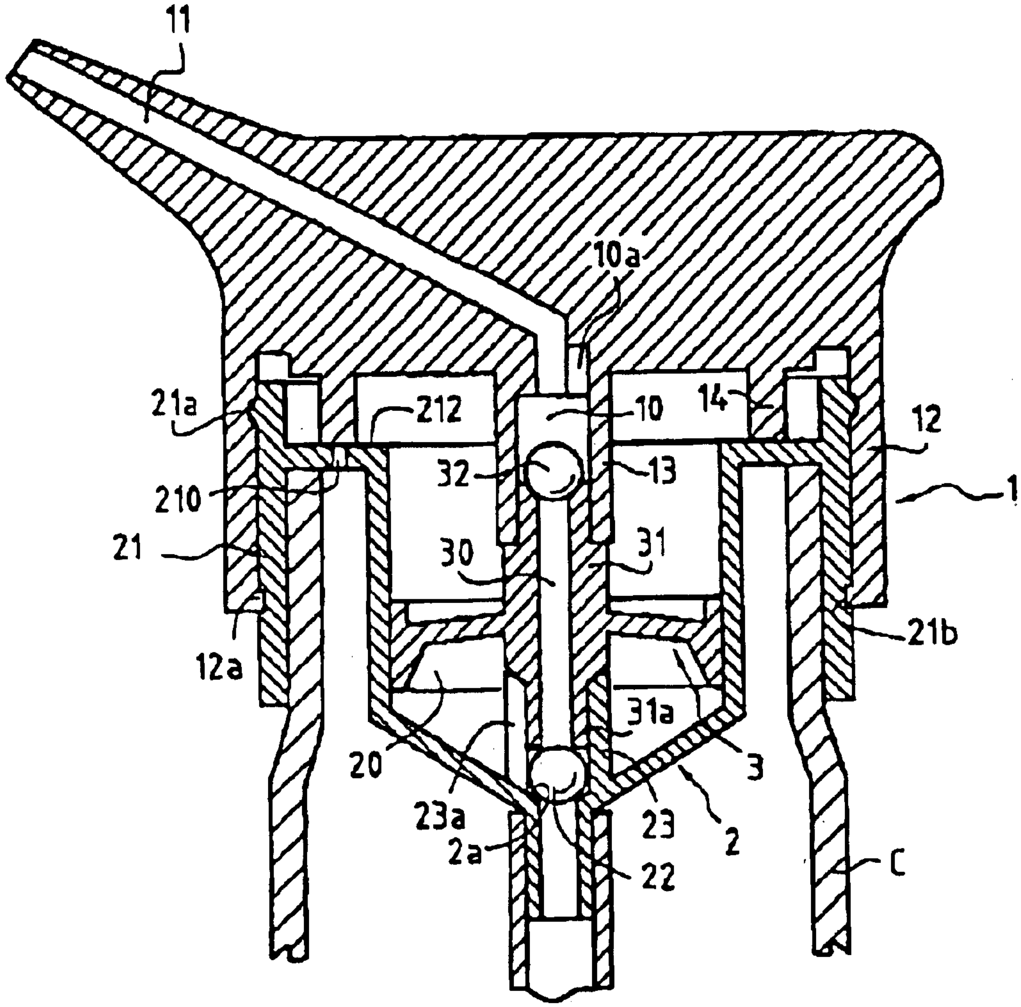
FIG. 1 is a sectional view of an embodiment of a device according to the invention.

The device shown in FIG. 1 is designed for metering liquid or gel products. To this end, the device comprises an axially mobile dispenser head 1 on top of a product reservoir R (of which only the neck C is visible in FIG. 1). The head 1 is provided with a product outlet duct 11.

The device also comprises a metering chamber 20 defined on the one hand by an inlet valve 22 and on the other hand by a piston 3, whose rod 31 is connected to the head 1. The piston 3 is equipped with an outlet valve 32.

In the embodiment shown, the inlet and outlet valves each comprise a mobile sealing ball. The chamber 20 is here formed in a socket 2 with a cylindroconical body, provided with an upper flange 21 for attachment to the rim of the neck C of the reservoir.

The rod 31 of the piston 3 is extended inside the chamber 20 by a lower projecting end 31*a* ensuring locking of the inlet valve 22 when the head 1 is in the lower position.

The head 1 comprises an outer lateral skirt 12 provided at its lower part with a catch rib 12*a* capable of cooperating with two catch abutments formed on the outer wall of the flange 21.

These two abutments are formed respectively of an upper retaining ring 21*a* limiting upward travel of the head and a lower recessed portion 21*b* ensuring that the head 1 is held in the lower position by disengageable latching of the rib 12*a*.

The inner periphery of the skirt 12 has an annular groove 12*b* into which the retaining ring 21*a* enters by latching when the head 1 is in the lower position.

In this lower position, the end 31*a* of the piston 31 may be very slightly compressed resiliently against the valve 22 and/or the seat 2*a* of the valve 22 may undergo slight resilient deformation to ensure sealed closure of said valve.

Axial displacement of the rod 1 is effected by pulling or pushing manually in push/pull mode in the absence of any return means, guidance being provided by sliding contact of the rib 12*a* on the outer wall of the flange 21, between the two abutments 21*a*, 21*b*.

The flange 21 is provided, where necessary, with a venting orifice 210. This orifice is disposed through the shoulder 212 providing connection with the body of the socket 2.

When the neck C is trapped with slight clamping between the body of the socket 2 and the side wall of the flange 21, provision is made for the orifice 210 to be extended by a vertical groove (not shown) formed on the outer wall of the body of the socket 2.

In the embodiment shown, said groove is not necessary, due to the fact that a space has been inserted which allows air to be taken back into the reservoir via the orifice 210.

Likewise, the very slight play existing between the internal wall of the skirt 12 and in particular the rib 12*a*, on the one hand, and the outer wall of the flange 21, on the other hand, is sufficient to allow air to be taken back in.

The head 1 comprises a cylindrical internal wall 14 situated coaxially and radially to the inside of the skirt 12 and designed to seal the venting orifice 210 when the head 1 is in the lower position.

To this end, the wall 14 is disposed opposite the orifice 210 and its thickness is greater than the diameter of the orifice 210.

When the head 1 is in the lower position, the wall in which the shoulder 212 is formed may undergo slight resilient deformation towards the inside of the receptacle under the effect of pressure exerted by the cylindrical wall 14, to ensure sealing of the vent 210.

The rod 31 of the piston 3 comprises over its entire height an axial ejection duct 30 opening, at the upper part, in a cavity 10 in the head 1 in which the outlet ball valve 32 is accommodated. The lower end of the duct 30 defines the orifice for evacuating the product from the chamber 20.

The cavity 10 is formed in a sleeve 13 integral with the lower part of the head 1 and connected coaxially with the upper end of the rod 31.

The upper wall of the cavity 10 is provided with a network of channels 10*a* communicating with the outlet duct 11 for the product and allowing passage of the product when the ball of the valve 32 is forced against said wall in the dispensing phase (see FIG. 2C) under pressure from the ejected product.

The inlet valve 22 comprises an axial tube 23 which projects inside the chamber 20 and in which the lower end 31*a* of the rod 31 of the piston 3 engages when the head 1 is in the lower position.

Figure 2A:
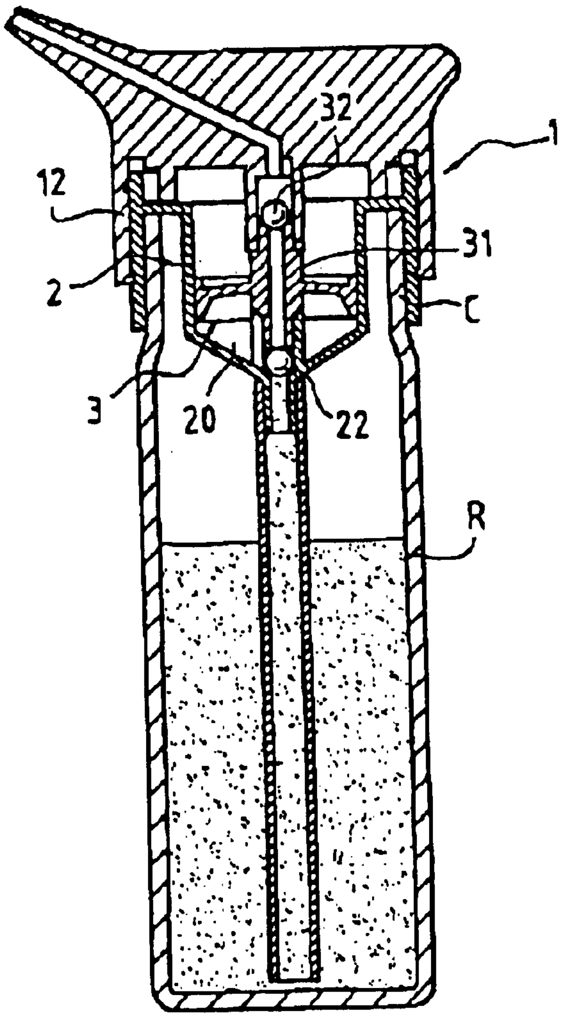
FIGS. 2A to 2D show sectional views of the device of FIG. 1, mounted on a product reservoir, during the various dispensing phases.

This engagement, which takes place without radial clamping, continues until the end 31*a* of the rod 31 comes to rest against the ball of the valve 22. Locking of the valve in this sealed position, corresponding to wedging of the ball in the bottom of the tube 23, is ensured by latching of the rib 12*a* in the recessed portion 21*b* of the flange 21, as shown in FIGS. 2A and 2D.

Figure 2B:
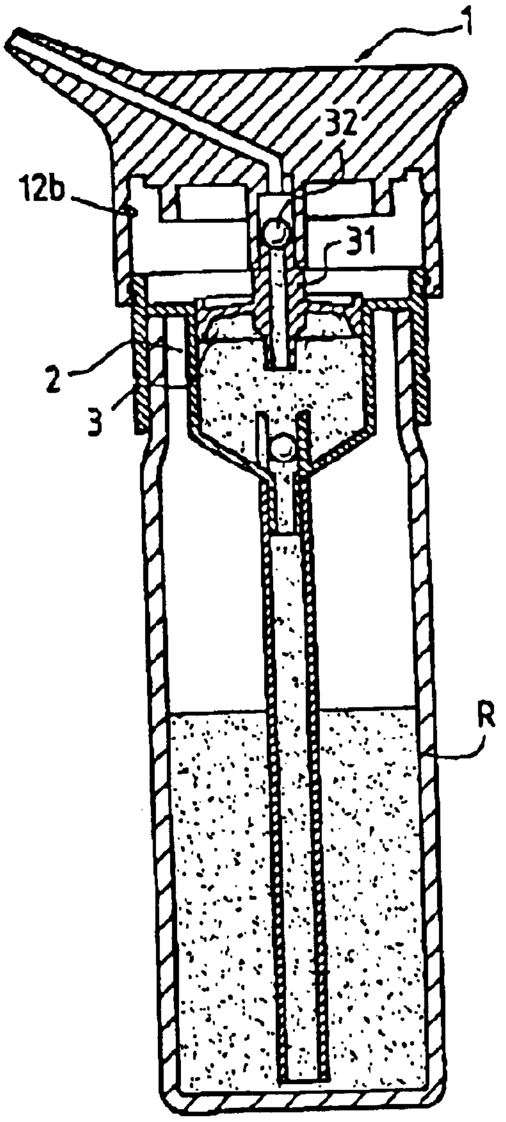
Figure 2C:
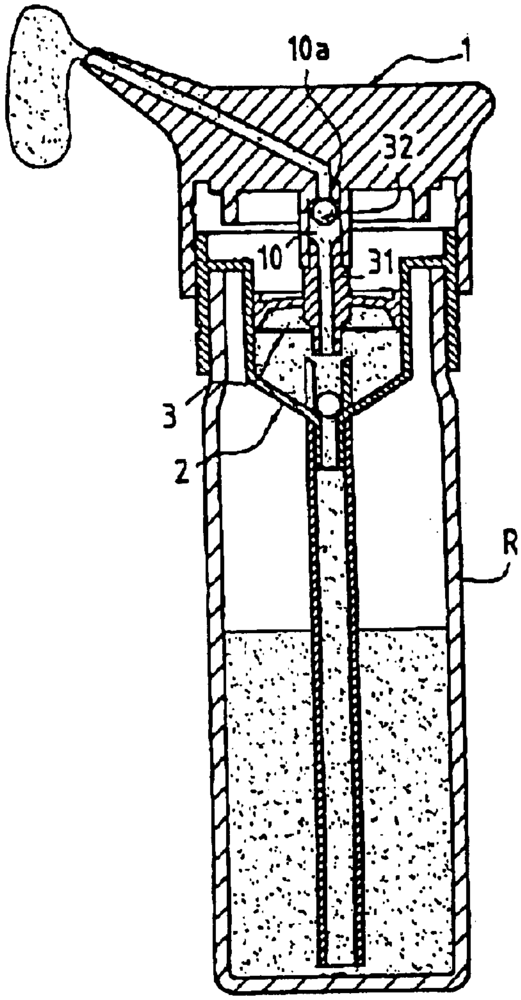
Figure 2D:
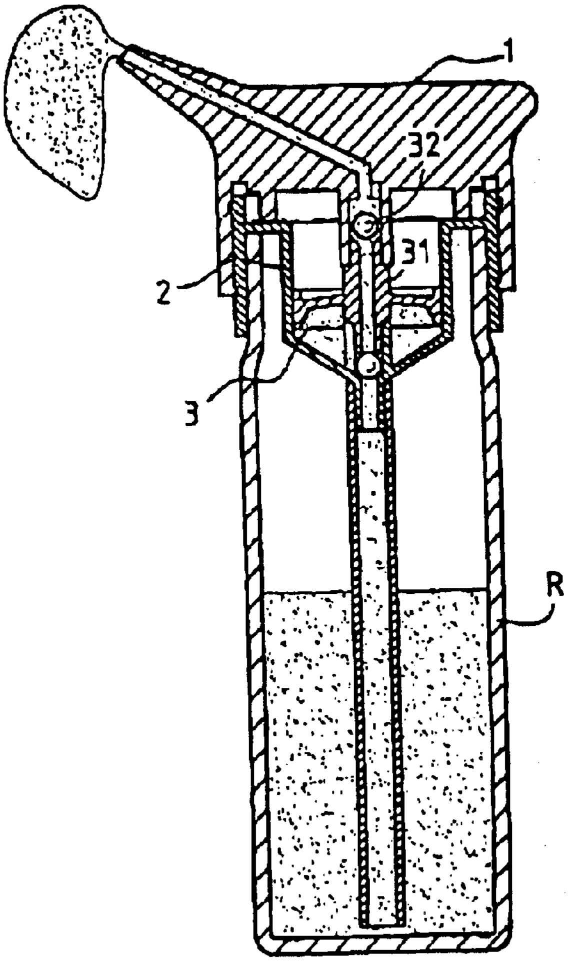

The side wall of the tube 23 comprises at least one port 23*a* allowing transverse passage of the product during filling of the chamber by raising of the head 1 and suction of the product, as shown in FIG. 2B.

While the above example illustrates a preferred embodiment of the present invention it is noted that various other arrangements may also be considered which fall within the spirit and scope of the present invention as defined by the appended claims.

What is claimed is:

1. A device for metering liquid or gel products from a product reservoir, comprising:

an axially mobile dispenser head comprising an outlet duct; and a metering chamber defined on the one hand by an inlet valve and on the other hand by a piston having a piston-rod connected to the head and having an outlet valve, the piston-rod being extended inside the chamber by a lower projecting end ensuring sealed locking of the inlet valve when the head is in a lower position, the chamber being formed in a cylindroconical socket having an upper flange for attachment to a rim of the reservoir, wherein the dispenser head comprises an outer lateral skirt provided with a first catch capable of cooperating by latching with a second, lower catch formed on the flange for catching the head in the lower position and capable of cooperating with a second, upper catch for holding the head in an upper position, and preventing separation, and wherein the device is free of a dispenser head displacement return means.

2. A device as claimed in claim 1, wherein the first catch is formed at the lower part of the outer lateral skirt.

3. A device as claimed in claim 1, wherein the first catch takes the form of a rib, while the second, lower catch takes the form of a lower recessed portion.

4. A device as claimed in claim 1, wherein the second, upper catch takes the form of an upper retaining ring.

5. A device as claimed in claim 4, wherein the outer lateral skirt has an annular groove capable of cooperating by latching with the retaining ring when the dispenser head is in the lower position.

6. A device as claimed in claim 1, wherein the flange is provided with a venting orifice.

7. A device as claimed in claim 6, wherein the head comprises a cylindrical internal wall, coaxial with the skirt and designed to seal the venting orifice when the head is in the lower position.

8. A device as claimed in claim 6, wherein the venting orifice is formed through a shoulder providing a connection with the body of the socket.

9. A device as claimed in claim 8, wherein the wall in which the shoulder is formed is capable of undergoing resilient deformation under the effect of pressure exerted by the cylindrical wall when the dispenser head is in the lower position.

10. A device as claimed in claim 1, wherein the piston rod comprises an axial ejection duct opening, at an upper extremity, into a cavity in the head in which the outlet valve is accommodated.

11. A device as claimed in claim 10, wherein the cavity is formed in a sleeve integral with the lower part of the head and connected coaxially with an upper end of the piston rod.

12. A device as claimed in claim 10, wherein an upper wall of the cavity is provided with channels communicating with the outlet duct for the product.

13. A device as claimed in claim 1, wherein the inlet valve comprises an axial tube projecting into the chamber and in which the lower end of the piston rod engages when the head is in the lower position.

14. A device as claimed in claim 13, wherein a side wall of the tube comprises at least one port for passage of the product.

15. A device as claimed in claim 1, wherein the inlet valve or the outlet valve comprise a mobile sealing ball.

* * * * *